United States Patent
Shibuya et al.

[11] Patent Number: 5,270,596
[45] Date of Patent: Dec. 14, 1993

[54] MINIATURE D-C MOTOR

[75] Inventors: Isao Shibuya; Kenji Hagiwara; Kazutoshi Yoshimura; Kenji Tsuyama, all of Matsudo, Japan

[73] Assignee: Mabuchi Motor Co., Ltd., Chiba, Japan

[21] Appl. No.: 920,753

[22] Filed: Jul. 28, 1992

[30] Foreign Application Priority Data

Jul. 30, 1991 [JP] Japan .................. 3-189085

[51] Int. Cl.5 ............................................. H02K 5/10
[52] U.S. Cl. .................. 310/40 MM; 310/88
[58] Field of Search ............ 310/40 MM, 85, 88, 89, 310/90, 91, 103, 105, 106

[56] References Cited

U.S. PATENT DOCUMENTS

| | | | |
|---|---|---|---|
| 3,643,120 | 2/1972 | Young et al. | 310/103 |
| 4,347,453 | 8/1982 | Gaus | 310/104 |
| 4,872,352 | 10/1989 | Alden et al. | 73/861.77 |
| 4,896,065 | 1/1990 | Tsuyama | 310/40 MM |
| 4,931,678 | 6/1990 | Lutz | 310/88 |

*Primary Examiner*—Steven L. Stephan
*Assistant Examiner*—Matthew Nguyen
*Attorney, Agent, or Firm*—McGlew and Tuttle

[57] ABSTRACT

A miniature d-c motor comprising a case on the inner circumferential surface of which a permanent magnet is mounted, a rotor consisting of an armature and a commutator, and a case cap on which brushes and input terminals are mounted; the rotor being supported via bearings provided on the case and the case cap, in which the miniature d-c motor is housed in a hermetically-sealed internal space defined by the hermetic case formed into a bottomed hollow cylindrical shape and the hermetic case cap fitted to an open end of the hermetic case, and an output shaft connected to a rotor shaft via a magnetic coupling is rotatably provided outside the bottom of the hermetic case.

13 Claims, 4 Drawing Sheets

F I G. 3
F I G. 4

MINIATURE D-C MOTOR

BACKGROUND OF THE INVENTION

This invention relates generally to a miniature d-c motor used in audio equipment, precision equipment, etc., and more particularly to a miniature d-c motor improved so as to prevent motor components from being deteriorated by the attack of oxygen and other substances existing in the air by forming an internal space for housing the motor, or the internal space of the motor itself, into a hermetically-sealed construction to prevent the entrance or escape of the air.

DESCRIPTION OF THE PRIOR ART

FIG. 1 is a longitudinal sectional front view illustrating the essential part of an example of miniature d-c motor of conventional types. In FIG. 1, numeral 1 refers to a case made of a metallic material, such as mild steel, formed into a bottomed hollow cylindrical shape, on the inner circumferential surface of which a permanent magnet 2 formed into an arc segment shape, for example, is fixedly fitted. Inside the case 1 provided is a rotor 5 consisting of an armature 3 facing the permanent magnet 2, and a commutator 4 is fitted. Numeral 6 refers to a case cap made of a synthetic resin or other insulating material, and formed in such a manner as to be engaged with an open end of the case 1. Numeral 7 refers to brush arms adapted to make sliding contact with the commutator 4, and fitted to the case cap 6, together with input terminal 8 electrically connected to the brush arms 7. Numerals 9 and 10 refer to bearings, fixedly fitted to the central part of the bottom of the case 1 and the case cap 6 to rotatably support shafts 11 and 12 comprising the rotor 5.

With the above construction, as current is fed from the input terminals 8 to the armature 3 via the brush arm 7 and the commutator 4 comprising the rotor 5, rotating force is imparted to the armature 3, which is in the electromagnetic field formed by the permanent magnet 2 fixedly fitted to the inner circumferential surface of the case 1, to cause the rotor 5 to rotate, thus driving external equipment (not shown) via the shaft 11 on the output side.

In a miniature d-c motor of the conventional type having the aforementioned construction, the atmosphere is an internal space defined by the case 1 and the case cap 6 cannot be completely sealed to prevent the entrance or escape of the atmosphere outside the motor due to the permeability of the bearings 9. This poses a problem that motor components could be oxidized by spark discharge and joule heat produced between the brushes (not shown) at the tips of the brush arms 7 and the commutator 4. Oxidation of motor components may lead to increased contact resistance at the sliding contacts, further accelerating the damage caused by spark discharge, aggravating the wear of the brushes and the commutator, and remarkably reducing the life of the motor.

Most miniature motors of the conventional type employ sintered oil-impregnated bearings or ball bearings as the bearings 9 and 10 supporting the shafts 11 and 12. Consequently, the bearing 9 itself, or the gap between shaft 11 and the bearing 9 on the output side cannot be sealed completely, though the case-cap side can be easily sealed. Thus, air may enter into or escape from the motor inside through the bearing 9 itself or the gap between the shaft 11 and the bearing 9.

Miniature d-c motors having the aforementioned gaspermeable construction cannot keep the internal space thereof clean, and particularly when used in environments containing corrosive gases or organic vapors, allow these harmful gases to enter into the internal space of the motor. These harmful gases tend to cause chemical reactions with component materials in the internal space in the presence of spark discharge or heat, producing a blackened substance as a mixture of reaction products and fine chips produced by the wear of the commutator and brushes. Due to its insulating properties, this blackened substance tends to make the contact between the commutator 4 and the brushes unstable, increasing the contact resistance between them. In this way, miniature d-c motors of the conventional type have a problem that entry of corrosive gases or organic vapors into the internal space of the motor deteriorates the functions of electrical sliding contacts and other motor components, and lowers the functions of the motor remarkably.

SUMMARY OF THE INVENTION

It is the first object of this invention to provide a miniature d-c motor having such a construction that an internal space for housing the motor, or the internal space of the motor itself, is kept from the air outside the motor.

It is the second object of this invention to provide a miniature d-c motor having such a construction that oxygen concentration in an internal space for housing the motor, or the internal space of the motor itself, can be reduced.

It is the third object of this invention to provide a miniature d-c motor having such a construction that humidity in an internal space for housing the motor or the internal space of the motor itself can be controlled to an optimal level.

It is the fourth object of this invention to provide a miniature d-c motor that can prevent motor components from oxidation, prevents harmful gases from entering into the motor inside, and perform stabilized functions over a long period.

BRIEF DESCRIPTION OF THE DRAWINGS

FIGS. 3 and 4 are diagrams illustrating typical oscillograph waveforms of currents flowing in a miniature d-c motor embodying this invention and a miniature d-c motor of the conventional type.

DETAILED DESCRIPTION OF THE EMBODIMENTS

Figure 1:
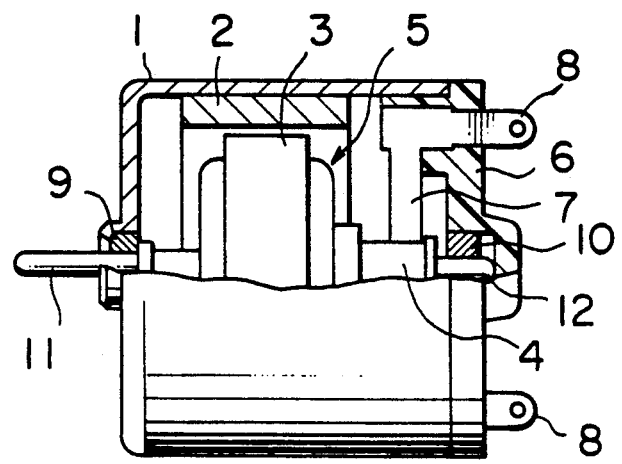
FIG. 1 is a longitudinal sectional front view illustrating the essential part of an example of miniature d-c motors of conventional types.
Figure 2:
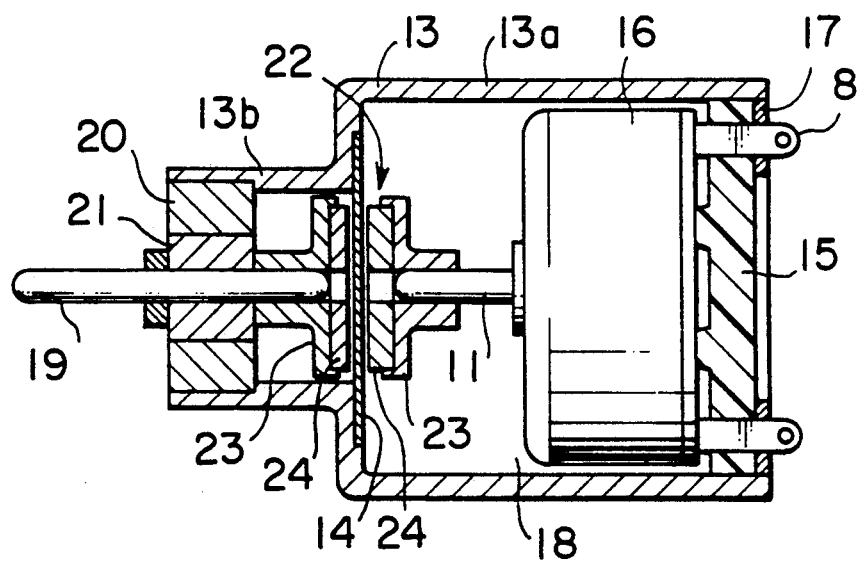
FIG. 2 is a longitudinal sectional view illustrating the first embodiment of this invention.

FIG. 2 is a longitudinal sectional view illustrating the first embodiment of this invention. In FIG. 2, reference numeral 13 refers to a hermetic case formed of a non-magnetic material, such as aluminum or a synthetic resin, into a hollow cylindrical shape integrating a large-diameter part 13a with a small-diameter part 13b. Numeral 14 refers to a partitioning plate made of aluminum, for example, fitted to a boundary part between the large-diameter part 13a and the small-diameter part 13b, and formed into an airtight construction. The partitioning plate 14 may be formed integrally with the hermetic case 13. Numeral 15 refers to a hermetic cap formed of an insulating material into a plate shape, and fitted to an open end of the large-diameter part 13a. Numeral 16 refers to a miniature d-c motor of such a construction as shown in FIG. 1, fitted to the hermetic cap 15; with the input terminals 8 thereof being passed through the hermetic cap 15 and protruded towards the outside. Numeral 17 refers to an adhesive applied to a joint of the hermetic case 13 and the hermetic cap 15 and to an area near the protruded parts of the input terminals 8. With the aforementioned construction, an internal space 18 defined by the hermetic case 13 and the hermetic cap 15 is in an airtight state preventing the entrance or escape of the air.

Next, numeral 19 refers to an output shaft fitted to the small-diameter part 13b of the hermetic case 13 rotatably and concentrically with a shaft 11 of the miniature d-c motor 16 via a bearing holder 20 and a bearing (sintered oil-impregnated bearing, for example) 21. Numeral 22 refers to a magnetic coupling for connecting the shaft 11 to the output shaft 19 in such a manner that power is electromagnetically transmitted from the shaft 11 to the output shaft 19. That is, holders 23 are each fixedly fitted to the shaft 11 and the output shaft 19; disc-shaped permanent magnets 24 each fixedly fitted to the end face of each of the holders 23 in such a manner as to face each other on both sides of the partitioning plate 14; the permanent magnets 24 may be magnetized in such a manner that a plurality of N and S magnetic poles are disposed alternately in the circumferential direction, or the permanent magnet 24 may be formed by arranging a plurality of magnet pieces formed into blocks in such a fashion that N and S magnetic poles are disposed alternately in the circumferential direction.

With the aforementioned construction, when the input terminals 8 are connected to a d-c power supply (not shown), the miniature d-c motor 16 begins operating, causing the shaft 11 to rotate. The rotation of the shaft 11 causes the magnetic coupling 22 to rotate, and the output shaft 19 electromagnetically connected to the magnetic coupling 22 is also caused to rotate, thus driving external equipment (not shown). In this case, since the internal space 18 in which the miniature d-c motor 16 is housed is hermetically sealed from the air outside the motor, corrosive gases or organic vapors are prevented from entering into the internal space 18 even when used in environments containing corrosive gases or organic vapors. As a result, the miniature d-c motor of this invention never experiences such deterioration of functions as encountered with the miniature d-c motor of the conventional type as shown in FIG. 1, and can perform functions stably over a long period.

Next, the results of a sulfur adhesion tests and an organic-vapor atmosphere tests will be described. In the sulfur adhesion tests, miniature d-c motors were placed in a thermostat oven held at 80° C., together with sulfur powder, and operated continuously for 48 hours. After that, the sulfur deposited on components within the miniature d-c motors was subjected to an EPMA qualitative analysis. The test results revealed that a large quantity of sulfur was detected on the miniature d-c motors of the conventional type as shown in FIG. 1, while no sulfur was observed on the miniature d-c motors of this invention as shown in FIG. 2.

In the organic-vapor atmosphere tests, ethylene glycol was charged in a thermostat oven held at 50° C., and miniature d-c motors were operated in this atmosphere for 100 hours to measure current waveforms flowing in the motors. FIGS. 3 and 4 show examples of current waveforms appearing on an oscillograph; FIG. 3 showing the current waveform obtained with the miniature motor of this invention, and FIG. 4 that obtained with the miniature d-c motor of the conventional type. As is evident from FIGS. 3 and 4, the current waveform of the motor of the conventional type was greatly fluctuated, indicating that the motor properties were deteriorated remarkably. The motor of this invention, on the other hand, had an extremely good current waveform, indicating that no deterioration of functions occurred even when operated in an organic-vapor environment.

Figure 5:
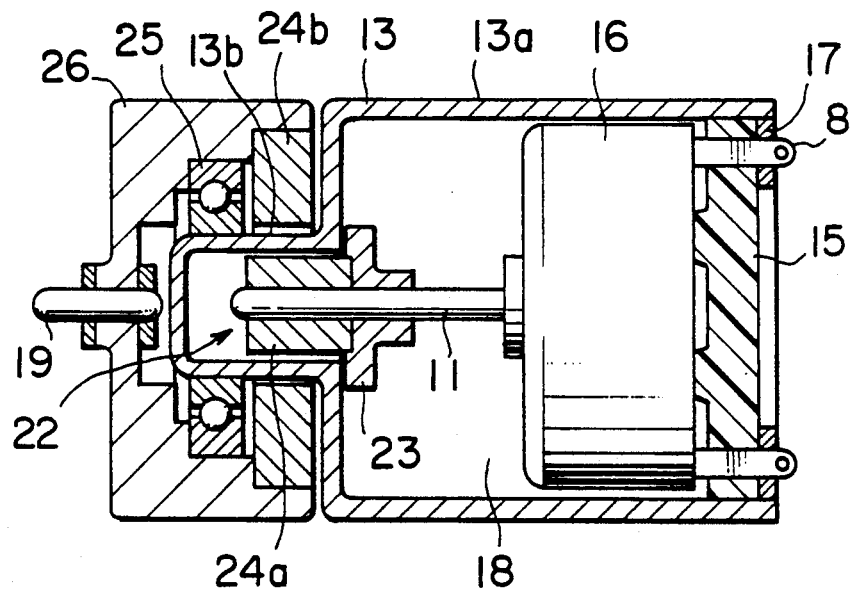
FIGS. 5 through 8 are longitudinal sectional views illustrating the essential part of the second through fifth embodiments of this invention.

FIG. 5 is a longitudinal sectional view illustrating the second embodiment of this invention. Like parts are indicated by like numerals used in FIG. 2. In FIG. 5, a permanent magnet 24a as a component of a magnetic coupling 22 is fixedly fitted to the shaft 11 via a holder 23, and formed into a hollow cylindrical shape and in such a fashion that a plurality of N and S magnetic poles appear alternately on the outer circumferential surface thereof. The permanent magnet 24a is provided in the small-diameter part 13b of the hermetic case 13. Another permanent magnet 24b is provided on an open end of a holder 26 formed into a cup shape, rotatably fitted via a bearing 25 provided on the small-diameter part 13b, and formed into a hollow cylindrical shape and in such a manner that a plurality of N and S magnetic poles appear alternately on the inner circumferential surface thereof and face the permanent magnet 24a. The output shaft 19 is provided concentrically with the shaft 11 on the outside end face of the holder 26.

With the aforementioned construction, as the miniature d-c motor 16 begins operating, the shaft 11 is rotated, causing the holder 26 and the output shaft 19 to rotate by means of the magnetic coupling 22. Thus, external equipment (not shown) can be driven as in the case of the first embodiment shown in FIG. 2. In this case, too, the miniature d-c motor 16 housed in an airtight state in the internal space 18 defined by the hermetic case 13 and the hermetic cap 15 has an air-shielding effect similar to the first embodiment shown in FIG. 2.

Figure 6:
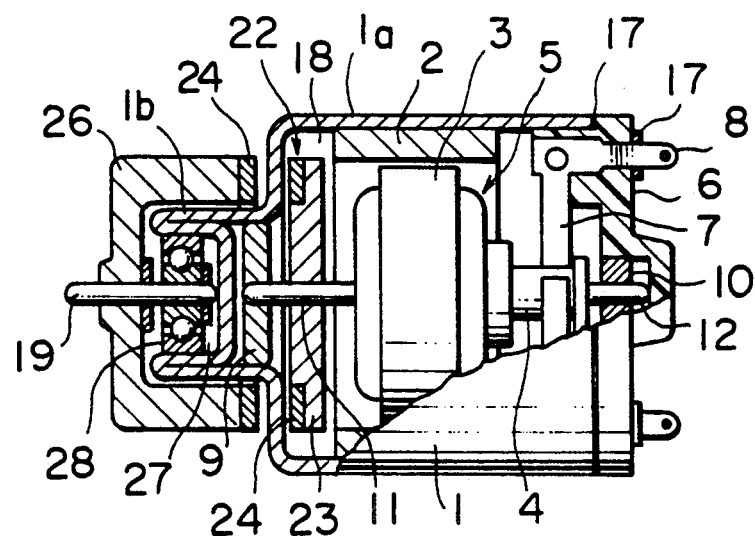

FIG. 6 is a longitudinal sectional view illustrating the third embodiment of this invention. Like parts are indicated by like numerals used in FIGS. 1, 2 and 5. In FIG. 6, a case 1 consists of a large-diameter portion 1a and a small-diameter portion 1b; the small-diameter portion 1b being formed into an enclosed construction having a recess 27 at the outer end thereof, and a bearing 28 being provided in the recess 27 to rotatably support an output shaft 19 and a holder 26. An adhesive 17 is applied to a joint between a case cap 6 engaging with an open end of the large-diameter portion 1a and the case 1 to make an internal space defined by the case 1 and the case cap 6 of a hermetically sealed construction. A hollow disc-shaped permanent magnet 24 comprising a magnetic coupling 22 is provided on the shaft 11 via a holder 23. Another permanent magnet 24 is fixedly fitted to an open end of a holder 26. The opposing end faces of the permanent magnet 24 are magnetized in such a fashion that a plurality of N and S magnetic poles are disposed alternately in the circumferential direction. The permanent magnet 24 may be formed by arranging a plurality of magnet pieces formed into blocks in such a manner that N and S magnetic poles are disposed alternately in the circumferential direction.

The operation achieved with the aforementioned construction is similar to that achieved with the first and second embodiment of this invention; the output shaft 19 can be caused to rotate, and the air is prevented from entering into the internal space 18. In addition, the construction shown in FIG. 6 may allow the hermetic case 13 and the hermetic cap 15 in the embodiments shown in FIGS. 2 and 5 to be omitted, making the entire motor assembly compact and small in size.

Figure 7:
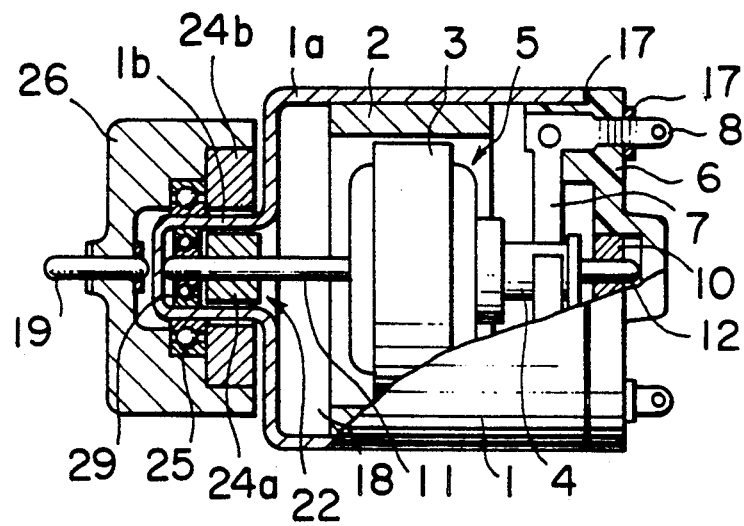

FIG. 7 is a longitudinal sectional view illustrating the essential part of the fourth embodiment of this invention. Like parts are indicated by like numerals used in FIGS. 5 and 6. In FIG. 7, numeral 29 refers to a bearing provided in the small-diameter portion 1b and rotatably supporting the shaft 11. The permanent magnet 24a comprising the magnetic coupling 22 is formed into a hollow cylindrical shape, fixedly fitted directly to the shaft 11, and disposed in such a manner as to face the hollow cylindrical permanent magnet 24b. Other features of construction are similar to those shown in FIGS. 5 and 6. The operation is also similar to that with the embodiments shown in FIGS. 5 and 6.

Similar sulfur adhesion tests and organic-vapor atmosphere tests to those conducted with the first embodiment were conducted with the second through fourth embodiments. The test results revealed that the same favorable performances as those achieved with the first embodiment can be obtained with the second through fourth embodiments.

Figure 8:
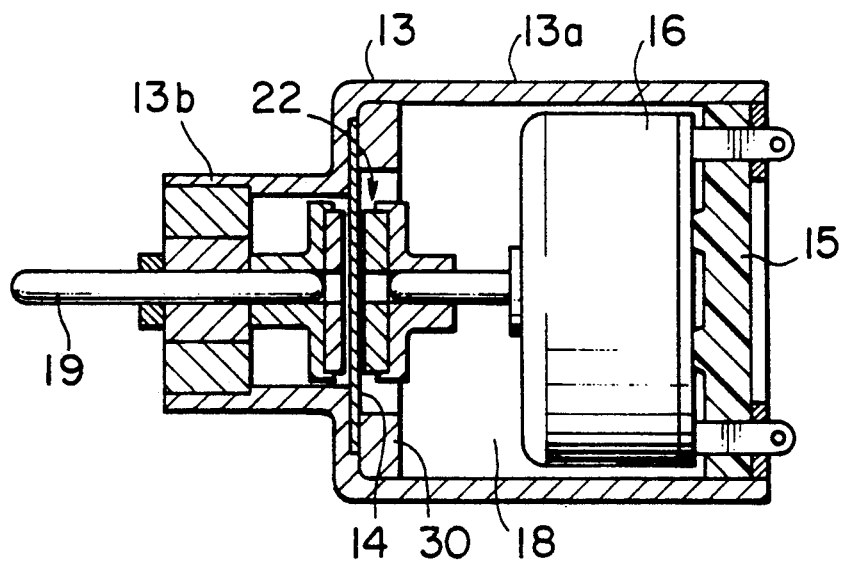

FIG. 8 is a longitudinal sectional view illustrating the essential part of the fifth embodiment of this invention. Like parts are indicated by like numerals used in FIG. 2. In FIG. 8, numeral 30 refers to a functional member formed into a hollow cylindrical shape, for example, and provided in the internal space 18. In this embodiment, the functional member 30 is pure iron powder, for example, encapsulated in a gas-permeable filter or paper, or formed into a ring shape by mixing with a resin, etc. The functional member 30 is fixedly fitted at a location where no interference is caused with motor functions in the internal space 18 by using an adhesive or press-fitting or other means.

This arrangement allows oxygen in the air within the internal space 18 to be absorbed by the functional member 30 by the chemical reaction of $4Fe + 3O_2 \rightarrow 2Fe_2O_3$, substantially reducing oxygen concentration in the internal space 18, or leading to an oxygen-free state. Thus, the oxidation of component members due to spark discharge between the brushes and commutator (both not shown) comprising the miniature d-c motor 16 and/or joule heat can be prevented.

Table 1 shows the results of life tests conducted on miniature d-c motors manufactured to the same specification.

TABLE 1

| Classification | No. | Elapsed time to irregular stop or normal stop (H) | Average life (H) |
|---|---|---|---|
| Conventional type | 1 | 195 to irregular stop | 134 |
| | 2 | 70 to irregular stop | |
| | 3 | 190 to irregular stop | |
| | 4 | 108 to irregular stop | |
| | 5 | 107 to irregular stop | |
| This invention | 6 | 311 to irregular stop | 350 |
| | 7 | 336 to irregular stop | |
| | 8 | 380 to normal stop | |
| | 9 | 340 to irregular stop | |

TABLE 1-continued

| Classification | No. | Elapsed time to irregular stop or normal stop (H) | Average life (H) |
|---|---|---|---|
| | 10 | 380 to normal stop | |

As is evident from Table 1, the conventional-type miniature d-c motors of Nos. 1 through 5, in which the oxidation of component materials proceeded due to the presence of air within the motor, have an average life of only 134 hours. On the other hand, the miniature d-c motors of this invention of Nos. 6 through 10, in the internal space 18 of which a functional member 30 having a deoxidizing function was provided, as shown in FIG. 8, have an increased average life of 350 hours. This is attributable to the fact that oxygen concentration in the internal space 18 was reduced substantially, preventing the oxidation of motor components. Note that the term "irregular stop" used in Table 1 means the stop of the motor rotating shaft due to the wear of component materials, whereas the term "normal stop" means the discontinuation of tests in a state where the motor rotation remains normal.

In this embodiment, description has been made on pure iron powder used as the functional member 30. However, this invention is not limited to pure iron powder, but Al, B, C, Cr, Mn, Si, Ti, V, Zr and any other elements, or their compounds, or a mixture of more than two kinds of them may be used so long as any of them has a great affinity to oxygen in the air. The shape of the functional member 30 may be selected appropriately so long as it can be placed in the internal space 18 and does not adversely affect motor functions.

Next, the sixth embodiment of this invention will be described, referring to FIG. 2. In FIG. 2, the air in the internal space 18 is replaced with nitrogen gas of a high purity (over 99.9%) or carbon-dioxide gas. The results of life tests conducted on the miniature d-c motors having this construction are shown in Table 2. The test results on the miniature d-c motors of the conventional type having the same specification as shown in FIG. 2 are also given in the table. The term "Irregular stop" used in Table 2 means the stop of motor rotating shaft due to the wear of component materials.

TABLE 2

| Classification | No. | Atmosphere | Elapsed time to irregular stop (H) | Average life (H) |
|---|---|---|---|---|
| Conventional type | 1 | Air | 321 | 334 |
| | 2 | | 379 | |
| | 3 | | 332 | |
| | 4 | | 305 | |
| This invention | 5 | Nitrogen gas | 1104 | 1197 |
| | 6 | | 1139 | |
| | 7 | | 1339 | |
| | 8 | | 1206 | |
| | 9 | Carbon dioxide | 2050 | 2022 |
| | 10 | | 1870 | |
| | 11 | | 2100 | |
| | 12 | | 2067 | |

As is obvious from Table 2, the conventional-type miniature d-c motors of Nos. 1-4, in which the oxidation of component materials proceeded due to the presence of air in the motor, has an average life of only 334 hours. The average life of the miniature d-c motors of this invention (Nos. 5-12), on the other hand, in which the air in the internal space 18 shown in FIG. 2 was replaced with nitrogen gas or carbon dioxide gas to produce an inert-gas atmosphere, increased three to five times as long as that of the conventional-type miniature d-c motors. This is attributable to the fact that the oxidation of motor component materials was prevented due to the inert-gas atmosphere present in the internal space 18. In addition to the gases used in this embodiment, helium gas, argon gas, etc. many used as the inert gas.

Next, the seventh embodiment of this invention will be described, referring to FIG. 8. In FIG. 8, silica gel, zeolite, cotton or any other material having a moisture-conditioning function is used as the functional member 30. That is, these materials are encapsulated in a gas-permeable filter or paper, or mixed with a resin and formed into a ring shape, and fixedly fitted at a location where no interference is caused with motor function in the internal space 18 using an adhesive, press-fitting or any other appropriate means. Then, the air inside the internal space 18 is replaced with nitrogen of a high purity (over 99.9%).

The results of life tests conducted on four miniature d-c motors having the aforementioned construction revealed that the motors can continue operation even after 5800 hours of test. The specification of the miniature d-c motor 16 of this embodiment is the same as that of the sixth embodiment. It follows from this that the average life of the miniature d-c motor of this embodiment has an average life more than ten times as long as that of the conventional-type miniature d-c motor, and more than five times as long as that of the motors of Nos. 5-8 in the sixth embodiment. This is attributable to the fact that the functional member 30 having a moisture-conditioning function provided in the internal space 18 keeps relative humidity at 40-80% within the temperature range of 20°-60° C. in the internal space 18, with the result that lubricating action between motor components is facilitated due to the adsorption of the monomolecular film of water, in addition to the operation achieved in the sixth embodiment. The same operation can be expected even when the inert gas is replaced by carbon dioxide, helium gas, argon gas, etc. other than nitrogen. The shape of the functional member 30 may be selected appropriately so long as it can be placed in the internal space 18 and does not interfere with motor functions, as in the case of the fifth embodiment.

The operations and effects expected by replacing the air inside the internal space with an inert-gas atmosphere have been described in the foregoing embodiments, referring to FIG. 2. Similar operations and effects can naturally be expected with the constructions shown in FIGS. 5 through 7.

This invention having the aforementioned constructions and operations can achieve the following effects.

(1) The miniature d-c motor of this invention in which an internal space for housing the motor, or the internal space of the motor itself, has an airtight construction can perform functions stably over a long period even in environments containing corrosive gases or organic vapors.

(2) Since the miniature d-c motor of this invention can remarkably reduce oxygen concentration in an internal space for housing the motor, or the internal space of the motor itself, to an oxygen-free state or an inert-gas atmosphere, the component materials can be prevented from being oxidized due to spark discharge and joule heat. This leads to a substantial increase in the service life of the motor.

(3) By providing a component having a moisture-conditioning function in an internal space for housing the motor or the internal space of the motor itself, the atmosphere in the internal space can be controlled to the optimum humidity, and lubricating action between the sliding components can be facilitated by the adsorption of the monomolecular film of water. This leads to an increase in the effects of extending the service life of the motor.

What is claimed is:

1. A miniature d-c motor comprising a case formed of a metallic material into a bottomed hollow cylindrical shape and having a permanent magnet fixedly fitted to an inner circumferential surface thereof, a rotor consisting of an armature facing said permanent magnet and a commutator, and a case cap fitted to an open end of said case and having brushes making sliding contact with said commutator and input terminals electrically connected to said brushes; said rotor being rotatably supported via bearings provided on a bottom of said case and said case cap, an internal space defined by said case and said case cap is made of an airtight construction; and an output shaft connected to said rotor via a magnetic coupling is rotatably provided on an outside of said case.

2. A miniature d-c motor as set forth in claim 1 wherein a functional member having a deoxidizing function is provided in said internal space.

3. A miniature d-c motor as set forth in claim 1 wherein an inert-gas atmosphere is formed in said internal space.

4. A miniature d-c motor as set forth in claim 1 wherein a functional member having a moisture-conditioning function is provided in said internal space.

5. A miniature d-c motor, comprising: a case defining a bottomed hollow cylindrical structure; a permanent magnet positioned at an inner circumferential surface of said case; a rotor including an armature facing said permanent magnet and a commutator, said rotor being positioned in said case adjacent said permanent magnet; a case cap fitted to an open end of said case, said case cap supporting brushes making sliding contact with said commutator and including input terminals electrically connected to said brushes; a rotor shaft connected to said rotor; a first bearing supported adjacent said bottomed portion and a second bearing supported by said case cap, said rotor shaft engaging said first bearing and said second bearing for rotational support of said rotor, said case cap being sealed airtight to said case; a first magnetic coupling element positioned within said airtight sealed case; output shaft bearing supported by said case on an outer side of said case; and a second magnetic coupling element positioned on said outside of said case positioned for cooperation with said first magnetic coupling element and coupled to said output shaft for driving said output shaft in rotation upon rotation of said rotor shaft.

6. A miniature d-c motor according to claim 5, further comprising: deoxidizing means positioned within said internal space for lowering an oxygen content of gas in said internal space.

7. A miniature d-c motor according to claim 5, wherein said internal space is filled with an inert gas.

8. A miniature d-c motor according to claim 5, further comprising: moisture-conditioning means provided in said internal space for reducing moisture content of gas within said internal space.

9. A miniature d-c motor, comprising: a case including a cylindrical structure with a bottom and opposite open end; a permanent magnet fixedly fitted to an inner circumferential surface of said case; a rotor including an armature and a commutator, said rotor being positioned within said case facing said permanent magnet; a rotor shaft connected to said rotor; a case cap fitted to said open end of said case, said case cap having brushes making sliding contact with said commutator and having input terminals electrically connected to said brushes; a first bearing supported by said case at said bottom of said case; a second bearing supported in said case cap, said first bearing and said second bearing being connected to said rotor shaft for support of said rotor shaft in rotation, said cap being sealed to said case in an airtight manner to define an airtight internal space; a first magnetic coupling means connected to said rotor shaft for rotation therewith; output bearings connected to said rotor case at said bottom; an output shaft supported for rotation by said output bearings; and second magnetic coupling means connected to said output shaft and positioned facing said first magnetic coupling element for rotation of said output shaft upon rotation of said rotor shaft.

10. A miniature d-c motor according to claim 9, wherein said case bottom defines a cylindrical portion of reduced diameter, said cylindrical portion of reduced diameter supporting said first bearing in said internal space and supporting said output bearing on an outside of said case.

11. A miniature d-c motor according to claim 10, further comprising: deoxidizing means positioned within said internal space for lowering an oxygen content of gas in said internal space.

12. A miniature d-c motor according to claim 10, wherein said internal space is filled with an inert gas.

13. A miniature d-c motor according to claim 10, further comprising: moisture-conditioning means provided in said internal space for reducing moisture content of gas within said internal space.

* * * * *